United States Patent [19]

Beacham et al.

[11] Patent Number: 4,585,150

[45] Date of Patent: Apr. 29, 1986

[54] MULTIPLE LIQUID PROPORTIONAL DISPENSING DEVICE

[75] Inventors: Robert C. Beacham; Robert E. Switek, Jr., both of Livermore; Jack Buelow, Danville, all of Calif.

[73] Assignee: The Clorox Company, Oakland, Calif.

[21] Appl. No.: 530,770

[22] Filed: Sep. 7, 1983

[51] Int. Cl.[4] .............................................. B67D 5/56
[52] U.S. Cl. .................................... 222/129; 222/481.5
[58] Field of Search ...................... 222/129, 478, 481.5, 222/480, 479, 440, 240

[56] References Cited

U.S. PATENT DOCUMENTS

| | | | |
|---|---|---|---|
| 2,438,906 | 4/1948 | Elsas et al. | 222/129 |
| 2,661,870 | 12/1953 | Huenergardt | 222/129 |
| 2,851,800 | 12/1974 | Swain | 222/481.5 |
| 4,174,789 | 11/1979 | West | 222/240 |
| 4,194,619 | 3/1980 | Schley | 206/217 |
| 4,226,341 | 10/1980 | Towns et al. | 222/440 |
| 4,346,823 | 8/1982 | Eppenbach | 222/129 |
| 4,380,307 | 4/1983 | Stillinger | 222/440 |

FOREIGN PATENT DOCUMENTS 2063219  6/1981  United Kingdom ............. 222/481.5

Primary Examiner—Joseph J. Rolla
Assistant Examiner—Kenneth Noland
Attorney, Agent, or Firm—Majestic, Gallagher, Parsons & Siebert

[57] ABSTRACT

The apparatus of this invention is for dispensing two liquids so that the ratio K of the flow rates of the liquids is substantially constant. The apparatus comprises two containers each having a dispensing orifice and an air vent passage having two ends, an inlet end at the outside surface of the container and an outlet end inside the container. In the preferred embodiment, the containers are geometrically proportional in shape with the dispensing or pouring orifices and vent passages all in corresponding locations. The ratio of the cross-sectional areas of the pouring orifices of the two containers is $CK^{5/6}$ where C is the ratio of the flow coefficients of the two liquids to be poured. When the containers are placed in the same spatial orientation and each filled to the same proportion of fullness with different liquids and then tilted simultaneously to the same pour angle while maintaining the outlet end of the vent passage at a higher elevation than the pouring orifice for each container, the ratio of the flow rates of the liquids poured from the pouring orifices of the containers is equal to K.

17 Claims, 8 Drawing Figures

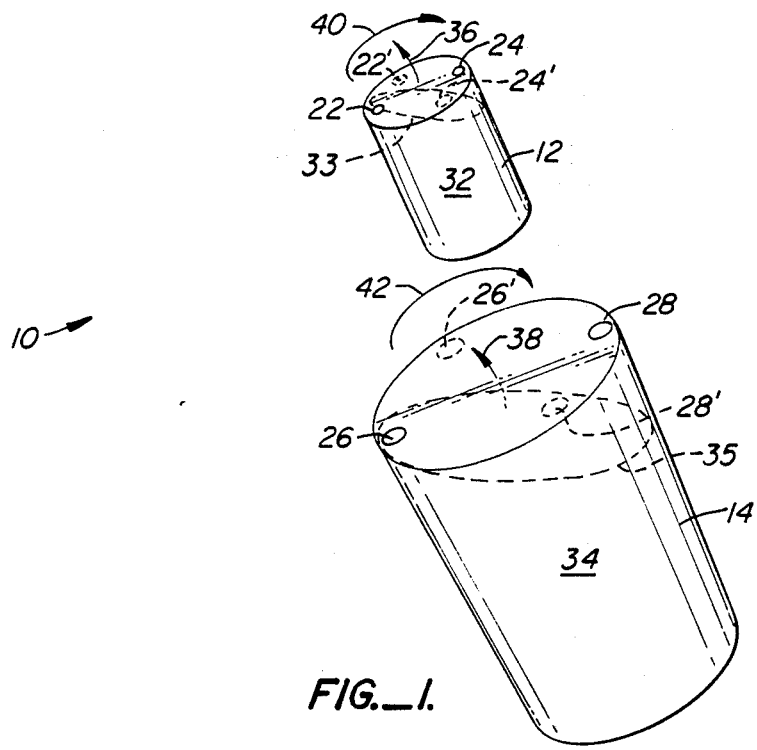
FIG._1.
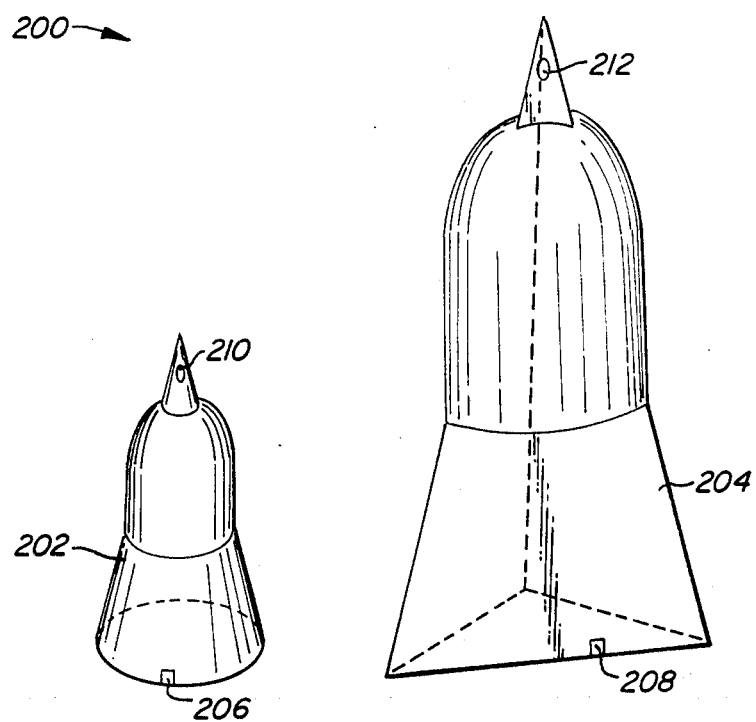
FIG._6.

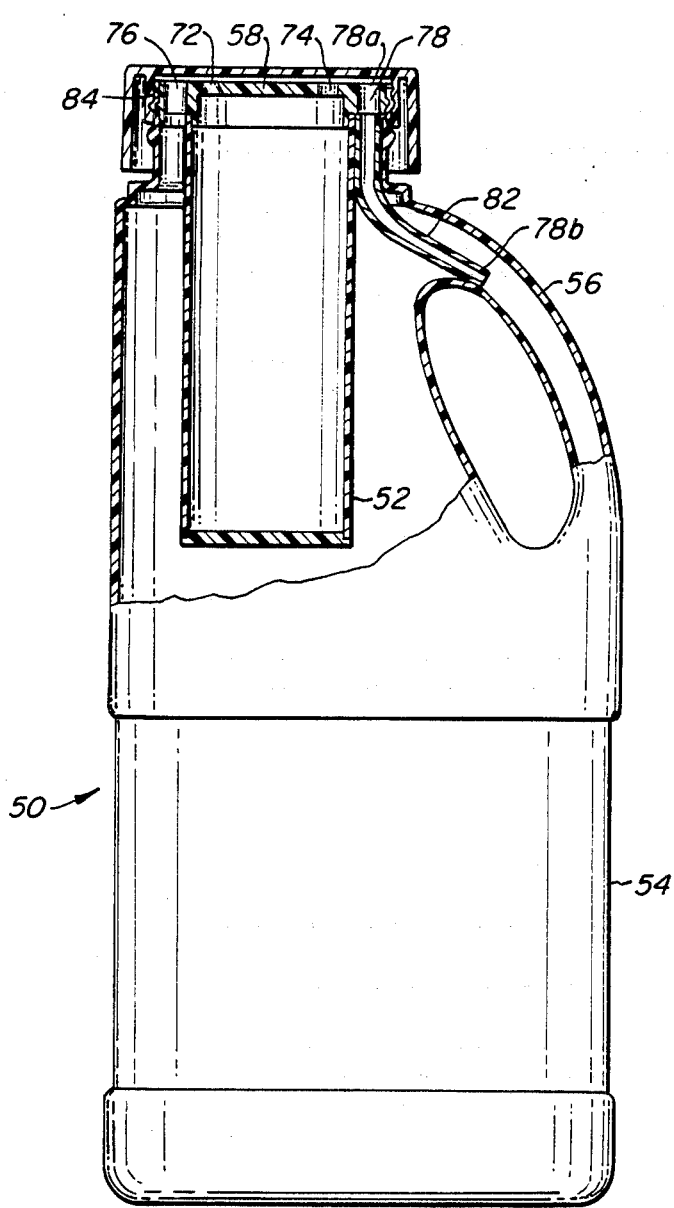
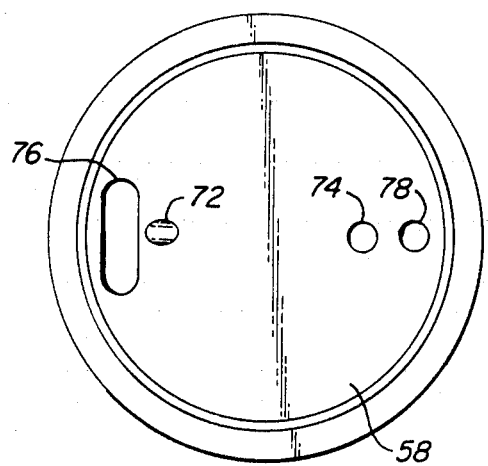
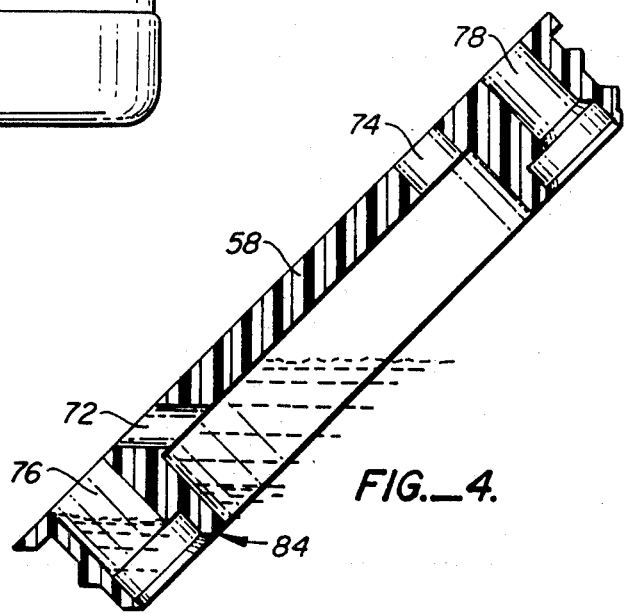

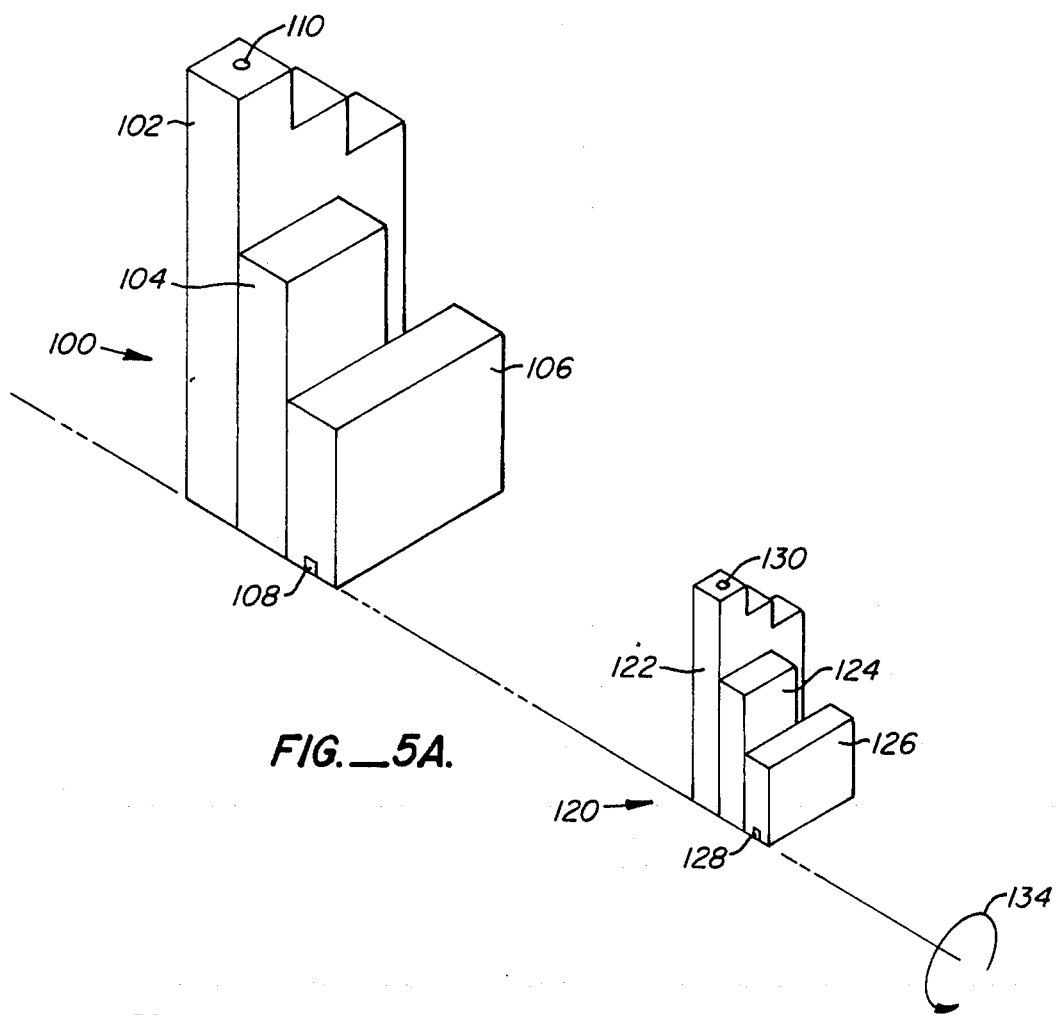
FIG._5A.
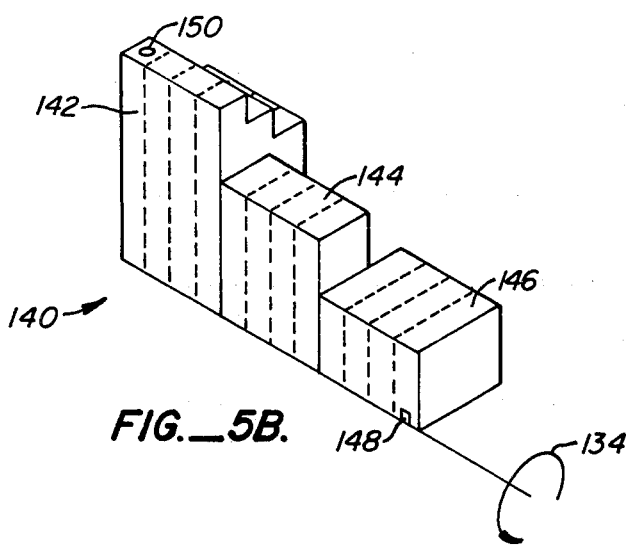
FIG._5B.
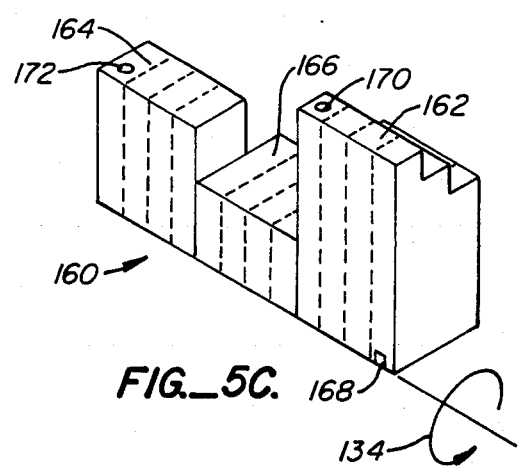
FIG._5C.

MULTIPLE LIQUID PROPORTIONAL DISPENSING DEVICE

BACKGROUND OF THE INVENTION

The invention relates generally to gravity dispensing systems and more particularly to proportional gravity dispensing devices for liquids.

In many applications it is desirable not to premix two or more liquids for later use but to mix the liquids only when they are ready to be used. Such is the case where the two or more liquids to be mixed will react chemically: epoxy and resin, oxidants and oxidizable materials such as bleach and detergents or bleach and color dyes. It is also desirable to mix immiscible liquids only at the time when they are to be used since a mixture of such liquids will not remain in permanent emulsion in a single mixture. Examples of such liquids are: hair dressing liqids such as an oil containing lanolin and an aqueous liquid containing alcohol; oil and vinegar used as salad dressing and mixed drinks such as fruit juice and alcoholic beverage. It is also frequently desirable for the volumes of the different liquids in the mixture to be in predetermined proportions.

In prior practice, proportional amounts of different liquids are dispensed consecutively and not simultaneously and the flow rates of the liquids are typically not controlled. In U.S. Pat. No. 2,661,870, Huenergardt discloses a container for dispensing two liquids simultaneously from two chambers of the container. Each chamber is connected by a passage to the top of the container. The ends of the passages at the top of the contaner (or outlets) have been calibrated so as to deliver predetermined portions of two liquids in the same proportion as the ration between the volumes of the two chambers. Huenergardt also discloses a container configuration wherein the two chambers are defined by two containers: an outer container containing and completely surrounding the inner container.

The dispensing container disclosed by Huenergardt, however, contains no means for venting so that when the liquids are delivered from the two chambers, apparently negative pressure may build up within the two chambers which may prevent any significant amount of liquids from being delivered. Thus, Huenergardt's container is apparently only capable of delivering small quantities of liquid and is therefore impractical for many laundry and food preparation applications. Because of the lack of venting, Huenergardt's container is not a free pouring system.

Other known types of dispensing containers include those where a predetermined volume or dosage of a liquid is dispensed. Such containers are disclosed in U.S. Pat. No. 4,226,341 (Towns et al.) and U.S. Pat. No. 4,346,823 (Eppenbach). Such containers, however, apparently do not dispense two or more different liquids simultaneously or in predetermined proportions.

SUMMARY OF THE INVENTION

The apparatus for dispensing liquids by gravity comprises a first and a second container. The first and second containers define respectively therein a first and a second chamber. The first and second chambers have respectively first and second liquid containing portions. Each of the two containers has at corresponding locations a vent passage and a pouring orifice for pouring liquids from the liquid containing portions. The vent passage of each container has two ends, an inlet end at the outside surface of the container and an outlet end inside the container. In the preferred embodiment, the liquid containing portion of the first chamber is geometrically proportional in shape to that of the second chamber. The volume of the liquid containing portion of the first chamber is K times that of volume of the portion of the second chamber. The ratio of the area of the pouring orifice of the first container to that of the second is $C_2 K^{5/6}/C_1$ where $C_1$, $C_2$ are the flow coefficients of the two liquids to be poured from the first and second containers respectively. When the liquid containing portions are placed in the same spatial orientation and each filled to the same proportion of fullness with different liquids, the geometrical proportionality in shape between the two chambers causes the liquid heads in the two portions to be at a constant proportion irrespective of the spatial orientation. When the containers are then further tilted simultaneously so that the two portions are tilted to the same pour angle while maintaining the outlet end of the vent passage at a higher elevation than the pour orifice for each container, the ratio of the flow rate of liquid poured from the first container to that of the liquid poured from the second container is K during the pouring process.

In another embodiment, the containers are rotated about a horizontal axis. The two chambers are so shaped that their cross-sections taken on planes normal to such axis of rotation at corresponding locations along the axis are geometrically proportional. The pouring orifices and the vent passages of the two containers are in corresponding positions. The volume of the liquid containing portion of the first container is K times that of the second container. The dimension of the chamber of the first container along the axis of rotation is m times that of the second container. The area of the pouring orifice of the first container is $C_2 m^{\frac{1}{2}} K^{\frac{3}{4}}/C_1$ that of the second container where $C_1, C_2$ are the flow coefficients of the two liquids to be poured from the first and second containers respectively. When the two liquid containing portions are placed in the same spatial orientation, each is filled to the same proportion of fullness with different liquids, and then the containers are tilted simultaneously about the axis of rotation so that the two portions are tilted to the same pour angle while maintaining the outlet end of the vent passage at a higher elevation than the pouring orifice for each container, the ratio of the flow rate of liquid poured from the pouring orifice of the first container to that poured from the pouring orifice of the second container is constant and equal to K.

In yet another embodiment, the dispensing orifices of the containers are located in or near their bottoms. The horizontal cross-sectional areas of the liquid containing portions of chambers at corresponding heights from the bottom are in constant proportions for all heights from the bottom. The ratio of the volume of the liquid containing portion of the first container to that of the second is K and the ratio of the area of the dispensing orifice of the first container to that of the second is $C_2 K/C_1 p^{\frac{1}{2}}$, where $C_1, C_2$ are the flow coefficients of the liquids in the first and second containers respectively, and p is the ratio of the height of the liquid containing portion of the first container to that of the second. When the portions are filled to the same proportion of fullness, the ratio of the flow rate of liquid poured from the dispensing orifice of the first container to that dispensed from the dispensing orifice of the second container is constant and equal to K.

In the three embodiments discussed above, the desired flow ratio of the two liquids can vary from a constant value within an acceptable range of values, deviations are permitted within a corresponding range from exact geometrical proportionality. Similarly, the orientations of the containers, the manner they are tilted, and their pour angles may also differ to an extent corresponding to the variation of flow ratio permitted.

BRIEF DESCRIPTION OF THE DRAWINGS

FIG. 1 is a perspective view of an apparatus for pouring liquids illustrating the preferred embodiment of this invention.

FIG. 2 is a cross-sectional view of a pouring device illustrating the preferred embodiment of this invention.

FIG. 3 is a top view of the top portion of the container to illustrate the preferred embodiment of this invention.

FIG. 4 is a cross-sectional view of a top portion of a pouring device to illustrate the preferred embodiment of this invention.

FIGS. 5A, 5B and 5C are perspective views of pouring devices illustrating an alternative embodiment of this invention.

FIG. 6 is a perspective view of a dispensing device illustrating a second alternative embodiment of this invention.

DETAILED DESCRIPTION OF THE PREFERRED EMBODIMENT

FIG. 1 is a perspective view of an apparatus for pouring liquids illustrating the preferred embodiment of this invention. As shown in FIG. 1, pouring apparatus 10 includes two containers 12 and 14 which are substantially proportional geometrically. While containers 12 and 14 are shown in FIG. 1 as cylindrical in shape it will be understood that containers of other shapes may also be used and are within the scope of this invention. Container 12 has a pouring orifice 22 and vent passage 24. Container 14 has pouring orifice 26 and vent passage 28 at locations corresponding to orifice 22 and vent passage 24 of container 12 so that container 14 is a scaled up model of container 12 except that the cross-sectional area of vent passage 28 need not be proportionally enlarged from vent passage 24. As described below, the area of orifice 26 bears a certain ratio to that of orifice 22, where such ratio is dependent upon the ratio between the dimensions of the two containers. Containers 12 and 14 are filled to the same proportion of fullness, say 80% of each of the two containers with two different liquids 32, 34 to levels 33,35 respectively. The two containers are then placed in substantially the same orientation and then simultaneously rotated in the same manner. It will be evident that liquids 32,34 will take on shapes that are geometrically proportional in all dimensions. Therefore irrespective of the direction of rotation or the particular positions of containers 12 and 14 provided that they have substantially the same orientation, the elevation of liquid 34 above orifice 26 (the vertical distance by which the level of liquid 34 is above orifice 26) is a constant predetermined proportion to the elevation of liquid 32 above orifice 22.

The amount of liquids that are poured from containers 12 and 14 depend on four factors: the elevations of the liquids above their respective orifices, the cross-sectional areas of the pouring orifices, the air pressures above the liquids inside the containers relative to atmospheric pressure, and the flow properties of the liquids and the orifices. Thus, the proportionality of containers 12 and 14 is but one of the four factors. The following example will illustrate the relationships between the four factors.

The flow rates from containers 12 and 14 are $Q_2$ and $Q_1$ respectively. It is now desired to pour the two liquids from the two containers so that the ratio $Q_1/Q_2$ is a substantially constant value K. It will be evident that to maintain such constant ratio the ratio of the volume ($V_1$) of liquid remaining in container 14 to that in container 12 ($V_2$) must be the same value K throughout the entire pouring process. Therefore, to maintain flow ratio K constant, the ratio of the elevation $L_1$ of liquid 34 above orifice 26 to the elevation $L_2$ of liquid 32 above orifice 22 must also remain constant. Thus, if pouring orifice 26 is larger in area than that required to maintain constant flow ratio K, $Q_1/Q_2$ will be greater than K. Then, soon after pouring begins $V_1/V_2$ will be less than K and will continue to decrease as liquids are poured from the two containers. Therefore, $V_1/V_2$ would decrease continually during the pouring process so that the ratio $L_1/L_2$ will also decrease continually throughout the process. Therefore, if the ratio of the cross-sectional areas of the two pouring orifices 26,22 differs from that required to maintain a constant flow ratio K, proportional elevations of the two liquids cannot be maintained during the whole pouring process even though they are of the correct proportion at the beginning of the pouring process.

The equation and the table below illustrate more completely the relationship between the four factors which together determine the amounts of liquids that are poured from containers 12 and 14.

$$Q = CA\sqrt{2gh}$$

| C | A | g | h |
|---|---|---|---|
| Flow Coefficient | Orifice Area | Acceleration of Gravity | Liquid Head |
| Orifice shape | | | Elevation of liquid above orifice |
| Orifice Geometry | | | Difference between atmospheric pressure and pressure in head space |
| Surface Condition | | | |
| Material of Construction of Orifice | | | |
| Flow Properties of Liquid | | | |

The above formula for flow rate Q through an orifice in the steady state flow is known in conventional fluid flow theory. As shown in the table, the flow coefficient C is affected by a number of factors such as the flow properties of liquids (for example, their viscosities), the shape and wall geometry of the orifice, the surface condition of the orifice and the material of which the orifice is constructed.

The quantity h known as liquid head depends on the elevation L of the liquid above the orifice and the pressure (usually of air) in the space within the container above the liquid known as the head space. For example, if there is no venting so that air from outside the container cannot enter the head space to replace the liquid poured, the air pressure in the head space will decrease so that it falls below atmospheric pressure, which reduces the quantity h thereby also reducing the flow rate. To provide proper venting, vent passages 24, 28 should not be restricted or blocked by liquid in the pouring process. To prevent vent passage 24 from being restricted, hindered or blocked by the liquid in container 12, vent passage 24 should remain above the horizontal plane passing through orifice 22 during the entire pouring process. In other words, vent passage 24 has a higher elevation than orifice 22. Similarly, vent passage 28 should remain above the horizontal plane passing through orifice 26 (has a higher elevation than orifice 26) during the entire pouring process.

As shown in FIG. 1, containers 12 and 14 are rotated in substantially vertical planes as shown by arrows 36,38 respectively. When the containers are rotated in vertical planes, vent passages 24,28 will remain at higher elevations than pouring orifices 22,26. If, however, the containers are rotated not in vertical planes the difference in elevation between the vent hole and pouring orifice may decrease. Rotation of the two containers in planes other than vertical are equivalent to rotating the two containers first in vertical planes as illustrated by arrows 36,38 and then rotating the two containers about their axes as illustrated by arrows 40,42, respectively. After such rotations, the positions of the vent passages and pouring orifices are at 24',28',22' and 26', respectively. As can be seen from FIG. 1 the difference in elevation between the vent passage and the pouring orifice has decreased for both containers such that for certain rotations in planes other than vertical, such rotations may cause the pouring orifices to have higher elevations than the vent passages. To provide proper venting, the vent passages should be at higher elevations than the pouring orifices.

If $Q_1$ and $Q_2$ represent the flow rates from containers 14 and 12, respectively and $V_1$, $C_1$, $A_1$, $h_1$ and $V_2$, $C_2$, $A_2$, $h_2$ the corresponding flow coefficients, orifice areas of orifices 26,22 and the corresponding head losses or liquid heads, then for constant proportional flows:

$$\frac{V_1}{V_2} = \frac{Q_1}{Q_2} = \frac{C_1 A_1 \sqrt{2gh_1}}{C_2 A_2 \sqrt{2gh_2}} = K$$

$$\frac{A_1}{A_2} \sqrt{\frac{h_1}{h_2}} = \frac{C_2}{C_1} K$$

Proportional shapes have the property that any dimension of the larger one is equal to the corresponding dimension of the smaller one times the cube root of the volume ratio between the two shapes. Container 12 and 14 are proportionate. Therefore, if the two containers are filled to the same proportion of fullness, say 80% full, then the bodies of the two liquids in the two containers are also proportional and the ratio of the liquid volumes is the same as the ratio of the volumes of the two containers. Therefore, the ratio of the liquid heads of the two liquids is equal to the cube root of the volume ratio between the two liquids which in turn is equal to the volume ratio between containers 12,14. In other words, $$\frac{h_1}{h_2} = \left(\frac{V_1}{V_2}\right)^{\frac{1}{3}} = K^{\frac{1}{3}}$$

Therefore, $$\frac{A_1}{A_2} = \frac{C_2}{C_1} K \sqrt{\frac{h_2}{h_1}} = K^{5/6} \frac{C_2}{C_1} \tag{1}$$

Hence, if the ratio of the areas of the two orifices 26,22 is $(C_2/C_1) K^{5/6}$ then the flow rate from container 14 will be K times that from container 12. The flow coefficients $C_1$, $C_2$ may be determined empirically by conventional methods. The ratio of the flow rates will remain substantially at such value no matter at what tilt angles the liquids are poured provided that there is proper venting and that the liquids flow out of the orifices over the entire areas of the orifices.

FIG. 2 is a cross-sectional view of a pouring device illustrating the preferred embodiment of this invention. As shown in FIG. 2, the pouring device 50 includes two containers connected at the top 52,54. Containers 52,54 are generally similar in shape geometrically even though the upper right hand portion of container 54 is dissimilar to the right upper portion of chamber 52. By placing container 52 inside container 54, container 52 displaces a volume of liquid from container 54 which causes the volumes of liquids inside the two containers to also deviate from exact geometrical proportionality. While geometrical proportionality is necessary in order to maintain a constant proportion between the volumes of the two liquids poured, approximate proportionality may be sufficient for many purposes where the proportion of the two volumes of liquids poured may vary to some extent from a constant value.

Therefore, depending upon the extent to which the flow ratio of the two liquids may vary from a constant value, deviations are permitted from exact geometrical proportionality and the amount of deviation may be chosen from a range that corresponds to the acceptable range for the flow ratio. In the same vein, the ratio of pouring orifice areas may differ slightly from the required value above if the flow ratio is allowed to vary. Similarly, the orientations of the containers, the manner they are tilted and their pour angles may differ somewhat if the flow ratio may vary from a constant value. All such configurations are within the scope of this invention.

Approximate proportionality may be desirable to enhance the practicality or usefulness of the pouring device. Thus, the right upper portion of container 54 is dissimilar to that of container 52 so that a handle 56 may be incorporated as part of container 54. It will be noted that the dissimilar portion of container 54 is so located that it frequently contains no liquid during the pouring process. Consequently, such dissimilarity will frequently not affect the proportionality of the two liquid bodies in the containers. In fact, only the portion of the chamber inside each of containers 52,54 which contains liquid during the pouring process affects the proportionality of the bodies of liquid in the two containers necessary for constant ratio flow rates. To provide constant ratio flow rates, only such portions of the containers need be proportional. The remaining portions of the containers need not be proportional. Thus, in the ratio $(C_2/C_1)K^{5/6}$ for the orifice areas, K is really the ratio of the volume of the liquid containing portion of the chamber in container 54 to that in container 52. As described below, other types of slight deviations from exact geometrical proportionality is employed to overcome surface effects that hinder fluid flow from small pouring orifices.

As shown in FIG. 2, container 52 is in the shape of a hollow cylinder. Container 54 is in the shape of a hollow cylinder with a larger diameter at its lower portion and it is also provided with a hollow handle 56. Containers 52,54 have a common top 58. Top 58 defines therein pouring orifice 72 and vent passage 74 for container 52 and pouring orifice 76 and vent passage 78 for container 54. The locations and shapes of orifices and vent passages are shown more clearly in FIGS. 3 and 4. As shown in FIGS. 2 and 3, pouring orifices 72 and 76 are located at corresponding locations of containers 52 and 54 so that the liquid heads of liquids inside containers 52 and 54 will bear a substantially constant ratio as the liquids are poured. As liquids are poured from the containers, venting will occur at vent passages 74,78.

As discussed above, there should be proper venting to maintain constant ratio proportional flows. As container 54 is tilted, pouring handle 56 frequently has a higher elevation than the remaining portions of the container. This may cause air pressure above the liquid in the handle to decrease to below atmospheric pressure thereby decreasing the flow rate. A vent tube 82 is provided as an extension of vent passage 78 to connect the chamber inside handle 56 to the atmosphere so that if air pressure inside the handle falls below atmospheric pressure, the pressure differential will cause air to be drawn through passage 78 into the handle to reduce the pressure differential.

In the above discussion in reference to FIG. 1, to achieve proper venting vent passages 24,28 should have higher elevations than the corresponding pouring orifices 22,26. Since vent passages 24,28 are relatively short, being equal to the thickness of the containers, the entire length of each of the two passages is essentially at the same elevation. Where the vent passage has been extended, such as vent passage 78 of FIG. 2 the inlet end 78a of the passage and the outlet end 78b of the passage may be at different elevations. To achieve proper venting, the outlet end 78b of the passage inside container 54 should be at a higher elevation than pouring orifice 76. It is preferable that the outlet end of the vent passage in the interior of the container also be in the air space above the liquid surface in as many pouring situations as possible especially when liquid flow is to begin.

As described above, in reference to FIG. 1, containers 12 and 14 should be in the same orientation and tilted in the same manner and to the same tilt angle in order to maintain a constant flow ratio. If the two containers 12 and 14 are not connected a person pouring the two containers to achieve constant flow ratio must exercise judgment as to the relative orientation, manner of rotation and tilt angle of the two containers during the entire pouring process. This requires great skill. It is desirable to eliminate the need for such skill, so that any person is capable of maintaining constant flow ratio even without paying too much attention. To eliminate any skill requirement, containers 52,54 are so connected to top 58 that they have substantially the same orientation as shown in FIG. 2. Since the two containers are rigidly connected through top 58, they will be tilted to substantially the same manner and pour angle, so that when they are filled to substantially the same proportion of fullness, the ratio of liquid flow rates from them will remain constant provided that the pouring orifices are properly sized as discussed above. It will be understood that other ways of rigidly connecting the two containers may be used and are within the scope of this invention.

To provide proper venting, the interior or outlet ends of vent passages 74,78 should be at higher elevations than orifices 72,76 respectively. For fluid flow to occur over the entire area of the orifices, the pour orifices 72,76 are made small relative to the flow rate desired so that a person pouring the liquids will tend to tilt the containers at a steeper angle. Such tilting will cause both orifices 72,76 to be inundated thereby ensuring that fluid flow occurs over the entire cross-sectional areas of the two orifices. To increase the likelihood of inundating orifice 76, orifice 76 is elongated in shape as shown in FIG. 3 with its length normal to the plane in which liquid is usually poured from the orifice. In general, the dimension of the orifice in the plane of pouring is reduced to increase the likelihood of inundation.

Since orifice 72 of the smaller container 52 is usually small, surface effects such as surface tension and adhesion to the walls of the orifice may hinder fluid flow from being initiated from container 52 until a sufficient liquid head has built up to overcome such surface effects. This causes the fluid flow from container 52 to be delayed to a time after the liquid flow from container 54 has already started. This reduces the volume of liquid poured from container 52 and causes the ratio of the volumes poured from the two containers in a given time to deviate from the constant. To overcome such surface effects container 52 may be slightly pretilted so that it is inclined at a small angle to the vertical in the at-rest position. Alternatively, a slightly wider and shorter container may be used to increase the liquid head inside the smaller container.

In the preferred embodiment described above, the system of two or more containers may be rotated in any manner provided that proper venting occurs, there being no restriction as to the plane of rotation. If, however, the containers are restricted to being tilted only about a horizontal axis then the containers need not be geometrically proportional in all dimensions to achieve constant proportional flows. This is illustrated in reference to FIGS. 5A, 5B and 5C. As shown in FIG. 5A, container 100 has three sections, 102, 104 and 106, which are hollow and connected internally so that liquids can flow freely between the three sections. Container 100 has a pouring orifice 108 and vent passage 110. Container 120 is geometrically proportional to container 100 in all dimensions wherein all the dimensions of container 120 are substantially half that of container 100. Therefore, sections 122,124,126 are each proportional in all dimensions to sections 102,104 and 106 of container 100 wherein all the dimensions 122,124,126 are half that of sections 102,104 and 106. Therefore the volumes of the three sections of container 120 are ⅛ that of the volumes of the three corresponding sections of container 100. Therefore, containers 100 and 120 are proportional in all dimensions, and, as before, if containers 100 and 120 are placed with the same orientation spatially and rotated about the same axis 134 and the pouring orifices are properly sized, the flow rates from the two containers will be at a constant ratio.

FIG. 5B is a perspective view of a container 140 comprising sections 142,144,146. Section 142 is equivalent to stacking four sections 122, side by side and eliminating the walls separating the four sections. The four sections making up section 142 are shown in dotted lines in FIG. 5B. To maintain the same liquid head in sections 122 and 142, the rate at which liquid is drained from section 142 should be four times that of the drain rate from section 122. Sections 144 and 146 are made in a similar manner from four of sections 124 and 126 respectively. In a similar manner, the drain rate from sections 144,146 should be four times that from sections 124,126 respectively in order to maintain the same liquid heads in corresponding sections. To allow such higher flow rates, the area of pouring orifice 148 should be four times that of orifice 128. Thus, the flow rates from containers 120 and 140 are proportional. Therefore, the flow rates from containers 100 of FIG. 5A and container 140 of FIG. 5B are also proportional. From the above discussion it will be clear that the flow rate from container 140 may be made proportional to the flow rate from containers 120 and 100 where sections 142,144,146 are made from three instead of four of the sections 122,124,126 respectively in which case orifice 148 will have an area three times that of orifice 128. Therefore the flow rates of containers 140 and 100 will be proportional irrespective of the dimensions of sections 142,144,146 parallel to the axis 134 so long as they remain in constant proportion and provided that the area of orifice 148 is adjusted accordingly. A comparison of containers 100 and 140 will show that container 140 is not proportional to container 100 in all three dimensions. Nevertheless, substantially constant ratio proportional flows is achieved.

From the above discussion, it is seen that substantially constant ratio proportional flows can be maintained for containers 100 and 140 provided that the area of orifice 148 is of the correct size. Thus, the dimension of container 140 along axis 134 may be expanded or contracted while still maintaining substantially constant ratio proportional flows as long as the proportion of dimensions of sections 142,144,146 along axis 134 remains constant. Stated differently, if containers 100 and 140 are such that cross-sections of both containers taken on planes normal to the axis of rotation and at corresponding points of the two containers are proportional in shape and if the correct pour orifice areas has been used then the ratio of the flow rates from the two containers will be substantially constant.

As shown above, if the two liquids poured from the containers in FIG. 1 have flow coefficients $C_1$, $C_2$ and if the ratio of the areas of the pouring orifices of the two containers is $(C_2/C_1) K^{5/6}$, K being the ratio of the volumes of the two containers, then the ratio of the flow rates from the two containers will be K. In reference to FIGS. 5A and 5B, if sections 142,144,146 are made from n of sections 122,124,126 respectively the area of orifice 148 is equal to n multiplied by (area of orifice 128) and is eqaul to $$\frac{C_1}{C_2} \frac{n}{K^{5/6}} \times \text{(area of orifice 108)} \quad (2)$$

If the volumes and areas of containers 140 and 100 are $V_{140}$, $A_{140}$, $V_{100}$, $A_{100}$ respectively, and the lengths of the containers 140, 100 along the axis of rotation 134 are $L_{140}$ and $L_{100}$ respectively and $V_{140}=K'V_{100}$ and $L_{140}=ML_{100}$ then $$V_{140} = K'V_{100} \quad (3)$$
$$V_{140} = K'KV_{120}$$
$$V_{140} = nV_{120}$$
$$\therefore n = K'K$$
$$L_{140} = mL_{100} = mK^{\frac{1}{3}}L_{120} \quad (4)$$
but
$$L_{140} = nL_{120}$$

-continued
$$\therefore n = mK^{\frac{1}{3}}$$

From equations (2), (3) and (4), $$\frac{A_{140}}{A_{100}} = \frac{C_1 n}{C_2 K^{5/6}} = \frac{C_1 m^{\frac{1}{3}} K'^{\frac{1}{3}}}{C_2}$$

wherein $C_1$, $C_2$ are the flow coefficients of liquids in containers 100,140 respectively.

Sections 164,166,162 of container 160 in FIG. 5C are equivalent to sections 142,144,146 of container 140 in FIG. 5B. It will be evident that the flow rates of containers 140,160 will be the same.

As in the preferred embodiment, only the portion of the chamber inside each of containers 100,140 which contains liquid during the pouring process affects the proportionality of the bodies of liquid in the two containers necessary for constant ratio flow rates. To provide constant ratio flow rates, only such portions of the containers need be proportional. The remaining portions of the containers need not be proportional. Thus, in the ratio $C_1 m^{\frac{1}{3}} K'^{\frac{1}{3}}/C_2$, K' is really the ratio of the volume of the liquid containing portion of the chamber in container 140 to that in container 100, and m is the ratio of the length of the chamber in container 140 to that of container 100.

FIG. 6 is a perspective view of a dispensing apparatus 200 comprising two containers 202,204 in which liquids are dispensed in constant proportion from the dispensing orifices 206,208 at or near the bottom of the two containers without tilting the containers. Container 202 is in the shape of a hollow cone with a vent passage 210 at the top and with a bulging middle portion. Container 204 is in the shape of a pyramid with vent passage 212 at the top and a bulging middle portion which is proportional in cross-sectional area to container 202 at corresponding heights from the bottom. If the two containers 202,204 are filled to substantially the same proportions of fullness and the dispensing orifices 206,208 properly sized, the volumes of liquids dispensed from orifices 206,208 will be in constant proportion. It will be noted that the horizontal cross-sections of the two containers are not geometrically proportional in shape, only the areas are proportional in value. It will be understood, however, that proportional flow will result provided that the areas of horizontal cross-sections at corresponding heights (that is, one-half or one-third of the height of the liquid column within the two containers from the bottom) are all in the same proportion. For proportional flow to be maintained, the two containers should not be tilted while liquids are dispensed which is different from the previous two embodiments. It will also be understood that the vent passages 210,212 need not be at the top of the containers provided that proper venting occurs.

If $Q_1$, $V_1$, $Q_2$, $V_2$ are the flow rates from and volumes of containers 202, 204, the for constant ratio flow rates, $Q_1 = K Q_2$, and $V_1 = KV_2$, K being a constant. If $L_1$, $A_1$, $L_2$, $A_2$ are the heights and dispensing orifice areas of containers 202, 204 where $L_1 = pL_2$, then $$Q_1 = C_1 A_1 \sqrt{2gL_1}$$

-continued
$$Q_2 = C_2 A_2 \sqrt{2gL_2}$$

where $C_1$, $C_2$ are the flow coefficients of liquids from containers 202, 204 respectively. Thus $$\frac{V_1}{V_2} = \frac{Q_1}{Q_2} = K = \frac{C_1 A_1}{C_2 A_2} \sqrt{\frac{L_1}{L_2}}$$

$$= \frac{C_1 A_1}{C_2 A_2} \sqrt{p}$$

$$\frac{A_1}{A_2} = \frac{C_2 K}{C_1 p^{\frac{1}{2}}}$$

Hence, to maintain constant flow ratio at K, the ratio of the pouring orifices should be $C_2K/C_1p^{\frac{1}{2}}$.

From the discussion in reference to FIGS. 1, 2, 3 and 4, it is shown that approximate proportionality is adequate for the preferred embodiment if the ratio of flow rates may vary to some extent from a constant value. Similarly, approximate proportionality is adequate for the two alternate embodiments illustrated in FIGS. 5A, 5B, 5C and 6, if the ratio of flow rates may also vary from a constant value.

As in the preferred embodiment, only the portion of the chamber inside each of containers 202,204 which contains liquid during the pouring process affects the proportionality of the bodies of liquid in the two containers necessary for constant ratio flow rates. To provide constant ratio flow rates, only such portions of the containers need be proportional. The remaining portions of the containers need not be proportional. Thus, in the ratio $C_2K/C_1p^{\frac{1}{2}}$ for the orifice areas, K is really the ratio of the volume of the liquid containing portion of the chamber in container 202 to that in container 204, and p is the ratio of the height of the liquid containing portion of container 202 to that of container 204.

The above description of method and construction used is merely illustrative thereof, and various changes in shapes and sizes or other details of the method and construction may be within the scope of the appended claims.

What is claimed is:

1. An apparatus for dispensing liquids by gravity comprising a first and a second container defining respectively therein a first and a second chamber, the first and second chambers having respectively a first and a second liquid containing portion, said containers each having at corresponding locations a vent passage and a pouring orifice for pouring liquid from the liquid containing portion, each of said vent passages having an inlet end at the outside surface of the container and an outlet end inside the container, said liquid containing portion of the first chamber being geometrically proportional in shape to that of the second chamber with the volume of the portion of the first chamber being K times that of the portion of the second chamber, wherein the area of the pouring orifice of the first container is $(C_2/C_1)K^{5/6}$ times that of the pouring orifice of the second container, where $C_1, C_2$ are the flow coefficients of the two liquids to be poured from the first and second containers respectively, so that when both liquid containing portions are placed in the same spatial orientation, filled to the same proportion of fullness with different liquids, and the containers are then tilted simultaneously so that the portions are tilted to the same pour angle, and wherein the outlet end of the vent passage is maintained at a higher elevation than the pouring orifice for each container during the pouring process, the ratio of the flow rate of liquid poured from the first container to that of the second is K during the pouring process.

2. The apparatus of claim 1, wherein the first and second containers are such that liquids are dispensed therefrom through gravity by free pouring.

3. An apparatus for dispensing liquids by gravity comprising a first and a second container each having a pouring orifice and a vent passage, said vent passage having an inlet end at the outside surface of the container and an outlet end inside the container, said containers being geometrically proportional in shape with the pouring orifices and vent passages all in corresponding locations, said containers having the same spatial orientation so that when the containers are each filled to the same proportion of fullness with different liquids and then tilted simultaneously to the same pour angle, wherein the outlet end of the vent passage is maintained at a higher elevation than the pouring orifice for each container during the pouring process, and wherein the ratio of the volume of the first container to that of the second is K and the ratio of the area of the pouring orifice of the first container to that of the second is $(C_2/C_1)K^{5/6}$, where $C_1$, $C_2$ are the flow coefficients of the two liquids in the first and second containers respectively, the ratio of the flow rate of liquid poured from the first container to that of the second is K during the pouring process.

4. The apparatus of claim 3, wherein the two containers are rigidly connected together with substantially the same orientation so that when one container is tilted to a pour angle, the remaining container is simultaneously tilted to the same pour angle.

5. The apparatus of claim 3 wherein a plane in which liquid is usually poured from the two orifices of the apparatus defines the pouring plane and wherein the cross-section of the pouring orifice of the larger of the two containers is elongated with its length substantially normal to the pouring plane to increase the likelihood of inundating such orifice at shallow pour angles when the container is tilted in the pouring plane.

6. A device for dispensing liquids by gravity comprising a container defining therein a first and a second chamber of substantially proportional geometrical shape, each chamber communicating with a medium surrounding the container through a pouring orifice and a vent passage located at corresponding positions for the two geometrically similar chambers, each vent passage having an inlet end at the surface of the corresponding container and an outlet end inside such container, the two chambers having substantially the same orientation so that, when the two chambers are filled to substantially the same proportion with two different liquids and when the container is then tilted so that the elevation of the outlet end of the vent passage remains above that of the pouring orifice during the pouring process wherein the ratio of the volume of the first chamber to that of the second is K and the ratio of the area of the pouring orifice of the first chamber to that of the second is $(C_2/C_1)K^{5/6}$, where $C_1$, $C_2$ are the flow coefficients of the two liquids in the first and second chambers respectively, the ratio of of the flow rate of liquid poured from the first container to that of the second is substantially constant and equal to K.

7. The device of claim 6 wherein the two pouring orifices and the inlets of the two vent passages are in the top side of the container so that both chambers can be completely filled without spilling, wherein the orifices and inlets are substantially collinear, and wherein the orifices are adjacent to each other but far apart from the inlets to facilitate pouring and venting.

8. The device of claim 6, wherein one chamber is within the other chamber.

9. The device of claim 8 further comprising a tube in the larger of the two chambers connecting the outlet end of the vent passage of the larger container to the interior of the container for facilitating venting.

10. The apparatus of claim 9 wherein a plane in which liquid is usually poured from the two orifices of the apparatus defines the pouring plane and wherein the cross-section of the pouring orifice of the larger of the two containers is elongated with its length substantially normal to the pouring plane to increase the likelihood of inundating such orifice at shallow pour angles when the container is tilted in the pouring plane.

11. An apparatus for dispensing liquids by gravity comprising a first and a second container defining respectively therein a first and a second chamber, the first and second chambers having respectively first and second liquid containing portions, said containers each having at corresponding locations a vent passage and a pouring orifice for pouring liquid from the liquid containing portion, each said vent passage having an inlet end at the outside surface of the container and an outlet end inside the container, said liquid containing portions being so shaped that their cross-sections taken on planes normal to a horizontal axis of rotation at corresponding locations along the axis, are geometrically proportional, wherein the volume of the liquid containing portion of the first container is K times that of the second container and the dimension of the chamber of the first container along the axis of rotation is m times that of the second container, and the pouring orifice of the first container is $C_2 m^{\frac{1}{2}} K^{\frac{3}{2}}/C_1$ to that of the second container, where $C_1, C_2$ are the flow coefficients of the liquids to be poured from the first and second containers, respectively, the two portions having the same spatial orientation so that when they are filled to the same proportion of fullness with different liquids and the containers are then tilted simultaneously about the axis of rotation, so that the portions are tilted to the same pour angle while maintaining the vent hole at a higher elevation than the pouring orifice for each container during the pouring process, the ratio of the flow rate of liquid poured from the pouring orifice of the first container to that of the liquid poured from the pouring orifice of the second container is constant and equal to K.

12. An apparatus for dispensing liquids by gravity comprising a first and a second container each having a pouring orifice and a vent passage, said passage having an inlet end at the surface of the container and an outlet end inside the container, said containers being so shaped that their cross-sections taken on planes substantially normal to a horizontal axis of rotation at corresponding locations along the axis are geometrically proportional and their pouring orifices and vent passages in corresponding positions, wherein the volume of the first container is K times that of the second container and the dimension of the first container along the axis of rotation is m times that of the second container and the pouring orifice of the first container is $(C_2/C_1)m^{\frac{1}{2}}K^{\frac{3}{2}}$ that of the second container where $C_1, C_2$ are the flow coefficients of the liquids to be poured from the first and second containers respectively, said containers having the same spatial orientation so that when the containers are each filled to the same proportin of fullness with different liquids and then tilted simultaneously about the axis of rotation to the same pour angle, wherein the vent hole is maintained at higher elevation than the pouring orifice for each container during the pouring process, the ratio of the flow rate of liquid poured from the pouring orifice of the first container to that of the liquid poured from the pouring orifice of the second container is constant and equal to K.

13. An apparatus for dispensing liquids by gravity comprising a first and second container defining respectively therein a first and a second chamber, the first and second chambers having respectively first and second liquid containing portions, said containers each having at corresponding locations a vent passage and a pouring orifice for pouring liquid from the liquid containing portion, each said vent passage having an inlet end at the outside surface of the container and an outlet end inside the container, wherein the horizontal cross-sectional areas of the liquid containing portions at corresponding heights from the bottom are in constant proportions for all heights from the bottom, wherein the volume of the portion of the first chamber is K times that of the portion of the second chamber and wherein the area of the pouring orifice of the first container is $C_2 K/C_1 p^{\frac{1}{2}}$ times that of the pouring orifice of the second container, where $C_1, C_2$ are the flow coefficients of the two liquids to be poured from the first and second containers respectively, and p is the ratio of the height of the liquid containing portion of the first container to that of the second container, so that when both liquid containing portions are filled to the same proportion of fullness with different liquids, the ratio of the flow rate of liquid dispensed from the dispensing orifice of the first container to that of liquid dispensed from the dispensing orifice of the second container is constant and equal to K.

14. An apparatus for dispensing liquids by gravity comprising a first and second container, each having a dispensing orifice in or near its bottom and a vent passage at a higher elevation than the pouring orifice, wherein the horizontal cross-sectional areas of the containers at corresponding heights from the bottom are in constant proportions for all heights from the bottom, wherein the ratio of the volume of the first container to that of the second is K and the ratio of the area of the dispensing orifice of the first container to that of the second is $C_2 K/C_1 p^{\frac{1}{2}}$, where $C_1, C_2$ are the flow coefficients of the liquids in the first and second containers, respectively, and p is the ratio of the height of the first container to that of the second, so that when the containers are filled to the same proportions of fullness, the ratio of the flow rate of liquid dispensed from the dispensing orifice of the first container to that of the liquid dispensed from the dispensing orifice of the second container is constant and equal to K.

15. A method for dispensing liquids by means of gravity from a pouring device comprising a first and a second container, each having a pouring orifice and a vent passage, said vent passage having an inlet end at the surface of the container and an outlet end inside the container, said containers being geometrically proportional in shape with the pouring orifices and vent passages all in corresponding locations, the volume of the first container being K times that of the second container, and the ratio of the pouring orifice of the first chamber to that of the second chamber being $C_2 K^{5/6}/C_1$ where $C_1$, $C_2$ are the flow coefficients of liquids in the first and second chambers, respectively, said method comprising filling the two containers to the same proportion of fullness with different liquids, placing the two containers so that they have the same spatial orientation, tilting the two containers simultaneously and in the same manner to the same pour angle while maintaining the outlet end of the vent passage at a higher elevation than the pouring orifice for each container during the pouring process, whereby the ratio of the volume of the liquid poured from the pouring orifice of the first container to that poured from the pouring orifice of the second container is constant and equal to K.

16. The method of claim 15 wherein the containers are tilted in two parallel vertical planes, with one of the planes passing through the pouring orifice and the vent passage of a container.

17. A method for dispensing liquids by gravity from a pouring device which includes a first and a second container each having a pouring orifice and a vent passage said vent passage having an inlet end at the outside surface of the container and an outlet end inside the container, said containers being so shaped that the cross-sections taken on planes normal to a horizontal axis of rotation at corresponding locations along the axis are geometrically proportional with their pouring orifices and vent passages in corresponding positions, wherein the volume of the first container is K times that of the second container and the dimension of the first container along the axis of rotation is m times that of the second container and wherein the ratio of the pouring orifice of the first container to the area of the orifice of the second container is $(C_2/C_1) m^{\frac{1}{2}} K^{\frac{3}{4}}$, where $C_1$, $C_2$ are the flow coefficients of liquids to be poured from the first and second containers, respectively, said method comprising filling the two containers to the same proportion of fullness with different liquids, tilting the two containers simultaneously about the axis of rotation to the same pour angle while maintaining the outlet end of the vent passage at a higher elevation than the pouring orifice for each container during the pouring process, whereby the ratio of the volume of the liquid poured from the pouring orifice of the first container to that of the liquid poured from the pouring orifice of the second container is a constant and equal to K.

* * * * *

UNITED STATES PATENT AND TRADEMARK OFFICE
CERTIFICATE OF CORRECTION

PATENT NO. : 4,585,150

DATED : Apr. 29, 1986

INVENTOR(S) : Beacham et al.

It is certified that error appears in the above-identified patent and that said Letters Patent is hereby corrected as shown below:

Col. 13, line 14: "claim 9" should be --claim 6--;

Col. 14, line 4: "proportin" should be --proportion--;

line 7: insert --a-- between "at" and "higher"; and line 42: insert --a-- between "and" and "second".

Signed and Sealed this

Fifteenth Day of July 1986

[SEAL]

Attest:

DONALD J. QUIGG

Attesting Officer

Commissioner of Patents and Trademarks